June 6, 1939.  P. F. DANEL  2,160,959
AUTOMATIC GATE
Filed Dec. 15, 1936
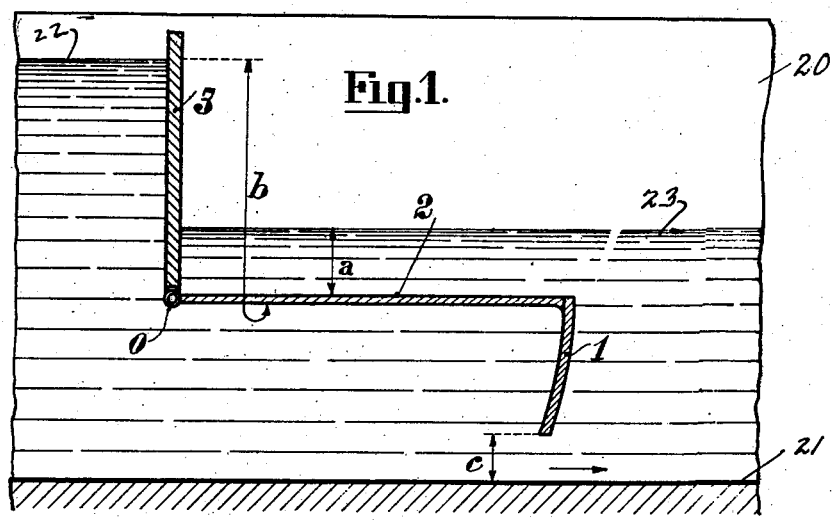
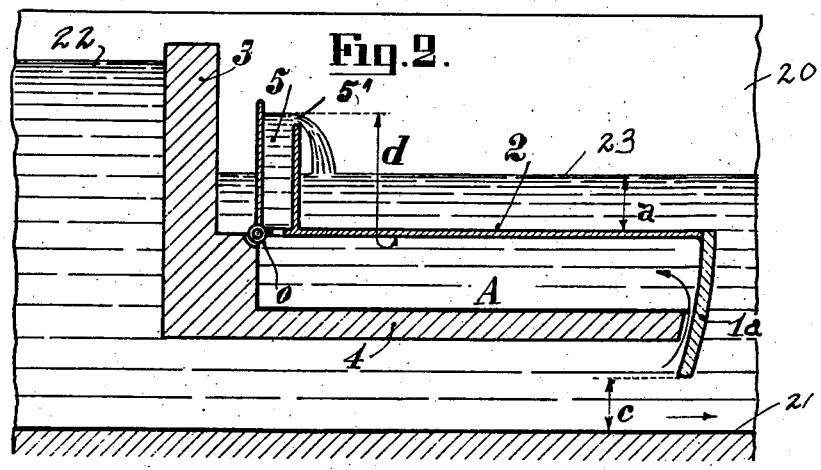
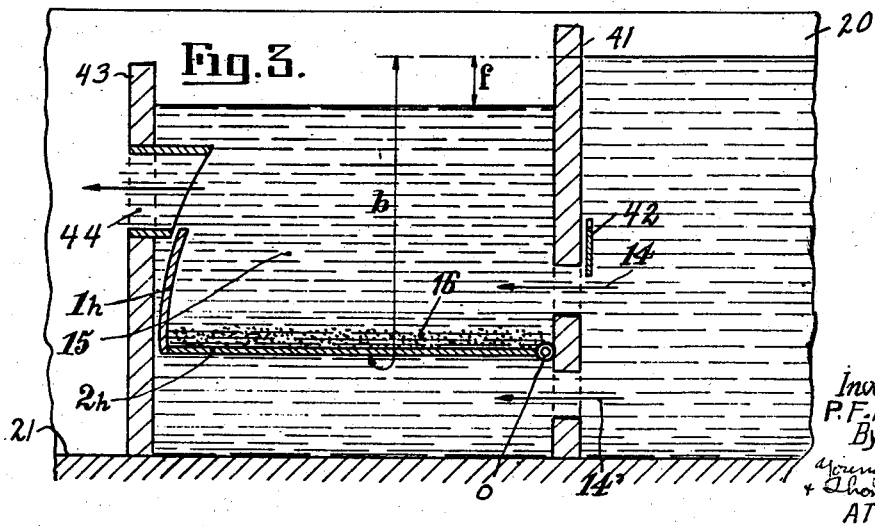
Inventor
P. F. DANEL
By
Young, Emery
& Thompson
ATTYS.

Patented June 6, 1939

2,160,959

UNITED STATES PATENT OFFICE 2,160,959

AUTOMATIC GATE

Pierre Francois Danel, Grenoble, France, assignor to Ateliers Neyret-Beylier & Piccard-Pictet, Grenoble, France, a company of France Application December 15, 1936, Serial No. 116,024 In France January 4, 1936

8 Claims. (Cl. 61—25)

This invention relates to an automatic differential gate, in particular for irrigation installations.

An object of this invention is to provide, in an open channel water system having a sudden drop in the level between upstream and downstream reaches, an automatic gate for maintaining a constant difference between the levels of said upstream and downstream reaches, whereby the same tranquil flow will exist in both reaches.

Another object of this invention is to provide, in an open channel water system having a sudden drop in the level between upstream and downstream reaches, an automatic gate for maintaining the level of the downstream reach constant.

A further object of this invention is to provide, in an open channel water system having a sudden drop in the level between upstream and downstream reaches, an automatic gate for maintaining the level of the upstream reach constant.

Still another object of this invention is to provide, in an open channel water system having a sudden drop in the level between upstream and downstream reaches, an automatic gate for maintaining a constant delivery.

With these and other important objects in view, which may be incident to my improvements, the invention resides in the parts and combinations to be hereinafter set forth and claimed, with the understanding that the several necessary elements comprising my invention may be varied in construction, proportions and arrangement, without departing from the spirit and scope of the appended claims.

One form of the present invention embodies an oscillating automatic gate comprising a gate leaf in the form of a cylindrical sector, the axis of which is coincident with the axis about which the gate oscillates. The gate leaf is connected to its axis by a continuous platform subjected on opposite sides to different pressures.

The gate leaf is immersed in the water and, by reason of the fact that it is in the form of a sector of a cylinder, the resultant of the hydraulic forces which are exerted on opposite sides thereof passes through the axis of oscillation and therefore does not give rise to any force tending to produce rotation about the axis to raise or lower the gate. The platform itself is subjected on opposite sides to different pressures, either hydraulic or atmospheric, creating a force balanced by the force due to the weight itself of the device. The platform is arranged to move between the side walls of the chamber or canal into which the gate is placed.

It is important that the platform is located in a zone where the water has only a low velocity, or preferably a zero velocity, so that the pressures exerted thereon are hydrostatic or practically hydrostatic. This can be obtained by the gate leaf being arranged beneath the platform and/or from the use of baffles and the like, as will hereinafter appear.

In order to make the invention more clearly understood, there is shown in the accompanying drawing means for carrying the same into practical effect without limiting the improvements in their useful applications to the particular constructions which, for the purposes of explanation, have been made the subject of illustration.

In the drawing:

Figure 1 is a diagrammatic longitudinal vertical sectional view of a channel provided with an automatic gate for maintaining a constant difference between the levels of the upstream and downstream reaches of water in the channel.

Fig. 2 is a view similar to Fig. 1, showing a modified form of gate for insuring the maintenance of a constant downstream level.

Fig. 3 is another view similar to that shown in Fig. 1, illustrating a modification for maintaining a constant delivery.

According to the present invention as shown in Fig. 1, an open channel defined by side walls 20 and a bottom 21 is provided with a vertical wall or dam 3 extending across the same for separating the upstream reach 22 from the downstream reach 23.

The flow of water from the upstream reach to the downstream reach is controlled by the automatic gate comprising the gate leaf 1 and the hinged carrier 2. As shown, the gate leaf 1 is in the form of a sector of a cylinder, the axis of which coincides with the axis of the hinge 0 connecting the carrier 2 to the lower edge of the wall 3. The carrier 2, which is made as a continuous solid platform, and the gate leaf 1 on the end thereof are of substantially the same width as the width of the channel, so that in oscillating about the axis 0 a substantially tight joint is provided between the side edges of the gate leaf and platform and the side walls 20 of the channel. With this construction, all of the water flowing from the upstream reach to the downstream reach must pass under the lower edge of the gate leaf 1.

By constructing the gate leaf 1 as a sector of a cylinder, the resultant of all forces acting thereon is in a radial direction and does not have any components tending to produce rotation of the gate about the hinge 0 to lift or lower the gate leaf 1.

Raising and lowering of the gate leaf 1 is effected by a pressure differential acting on the carrier or platform 2. The pressure exerted on the upper face of the platform 2 corresponds to the head or column of water which bears thereon—that is to say, the head $a$. The pressure exerted on the lower face of the platform corresponds to the head or column of the upstream reach of water—that is to say, the head $b$.

The gate is therefore subjected to a force varying with the head $b$ which tends to lift the gate leaf. The weight of the platform and gate leaf and the force varying with the head $a$, on the contrary, tend to lower it. The position of equilibrium fixes the mean position of the gate, corresponding to a determined orifice $c$ for the flow of water.

It will be understood that when the upstream level rises, the gate leaf itself tends to rise, increasing the orifice $c$ until the conditions of equilibrium are re-established between levels of the upstream and the downstream reaches. The same applies when the upstream level descends and when the downstream level falls or rises. The constant difference in level between the upstream and the downstream is therefore obtained automatically.

A modification of the present invention is shown in Fig. 2. In this figure, the vertical wall or dam 3a has a horizontal partition 4 extending under the platform 2a of the gate. As clearly shown in Fig. 2, the horizontal partition 4 extends almost to the gate leaf 1a so as to provide a narrow passage along the inner face of said gate leaf for the inflow of water into the chamber A provided between the platform 2a and the horizontal partition.

A vertically extending conduit 5 is carried by the platform 2a adjacent the hinge thereof for the outflow of water from the chamber A. By reason of this construction, the underside of the platform 2a will be subjected to a constant pressure, the value of which corresponds to the head $d$ of water in the conduit 5. This construction insures a constant downstream level. If it is assumed that the gate is situated in a position of equilibrium corresponding to the normal downstream level, then when this level falls the pressure due to head $d$ acting under the platform 2a and tending to raise it overcomes the pressure due to head $a$ of the downstream level tending to lower the gate and causes the gate leaf 1a to rise and permit a much greater delivery through the orifice $c$.

On the other hand, if the downstream level rises beyond the predetermined level for which the gate is constructed, the pressure due to the head $a$ increases and the difference between the heads $d$ and $a$ being insufficient to hold the gate in equilibrium permits the same to be lowered to reduce the orifice $c$ which will tend to reduce the downstream level.

It is obvious that the operation of the gate shown in Fig. 2 serves to maintain a constant downstream level.

The device shown in Fig. 2 is useful for producing a constant discharge. For this purpose a weir or fixed orifice 5' may be provided downstream of the device and since the level of the water between the device and weir is maintained constant, the discharge over the weir will be constant.

In Fig. 3, there is shown a device for effecting a constant delivery. In this construction, a wall or dam 41 provided with upper and lower submerged orifices 14 and 14', respectively, extends across the channel. The upper orifice 14 is provided with an adjustable closure 42. Another wall 43 extends across the channel further downstream and cooperates with wall 41 to provide a chamber 15. Wall 43 is provided with a discharge opening fitted with a conduit 44, the upstream end of which is curved as shown.

A gate leaf 1h for controlling the discharge through outlet conduit 44 is carried by a horizontal platform 2h connected to wall 41 intermediate the upper and lower orifices 14 and 14' by a hinge 0. The platform extends across the chamber 15 and is subjected on its under surface to a pressure corresponding to head $b$. Platform 2h is subjected on its upper surface to a pressure corresponding to the level of water in the chamber 15 represented by $b$ minus $f$. The difference between the level of the upstream reach and the level of water in chamber 15 is equal to $f$.

With this construction, when the upstream level rises, the pressure corresponding to head $b$ exerted on the under surface of the platform 2h tends to cause the gate leaf 1h to rise, thus constricting the outlet orifice 44 which effects a corresponding elevation of the level in the chamber 15 until equilibrium is again re-established. A constant delivery through the orifice 44 is obtained when the gate leaf 1h is raised, because while the conduit 44 is partly closed the head producing discharge therethrough is increased.

By varying the orifice 14, the discharge through conduit 44 will be varied.

In the arrangement which has been described, the solid materials entrained by the upstream water may be deposited on the platform 2h, as indicated at 16 in Fig. 3, and should be removed or prevented from settling thereon.

In all of the arrangements described, it is sufficient, for modifying the adjustment of the gate, to vary the weight thereof.

Further, in the devices provided with a weir, the adjustment may also be modified by varying the level of the crest of the said weir.

It may also be mentioned that, contrary to what is the case in existing apparatus adapted for the same purpose, the verification, the maintenance and the cleaning of the movable assembly may be effected without difficulty and without dismantling being necessary. It suffices to raise the platform to the vertical so as to enable its lower face to be reached.

The forms of construction above described show that the device of the present invention lends itself, by means of suitable constructional modifications, to vary diverse applications, which all remain within the essential scope of the invention.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention or exceeding the scope of the appended claims.

I claim:

1. In a water system, an open channel defined by side and bottom walls and having a sudden drop in the level between upstream and downstream reaches, a vertical wall separating the upstream and downstream reaches, extending across said channel between the side walls and having its lower edge spaced above the bottom wall, a substantially horizontal platform positioned between the side walls on the downstream side of the vertical wall and having its upstream end hinged to the lower edge of the vertical wall, and a gate leaf depending from the downstream end of the platform and extending across the channel, said gate leaf being in the form of a sector of a cylinder the axis of which coincides with the axis of the hinge between the platform and vertical wall.

2. A gate for controlling the flow between upstream and downstream reaches of an open channel, comprising a substantially horizontal platform subjected to differential pressures, a transverse wall, means for hinging one end of said platform on said transverse wall, and a gate leaf carried by the other end of said platform, the gate leaf being in the form of a sector of a cylinder the axis of which coincides with the axis of the hinging means.

3. A gate for controlling the flow between upstream and downstream reaches of an open channel, comprising a wall extending across said channel, a gate leaf in the form of a sector of a cylinder, means for mounting said gate leaf for movement about a horizontal axis coincident with the axis of the cylinder of which the leaf is a sector on the lower edge of said wall, and a platform extending between said leaf and said axis, subjected to a force corresponding to the difference in head between the upstream and downstream reaches, for lifting said gate leaf about said axis.

4. In a water system, means including an open channel for the flow of a stream of water, an automatic gate extending across said channel and separating an upstream reach of said stream from a downstream reach thereof, said gate comprising a wall extending across said channel, a substantially horizontal platform, means for hingedly mounting on said wall one end of said platform for substantially vertical swinging movement about a horizontal axis extending across said channel, and a gate leaf carried by the free end of said platform and extending across said channel for controlling the flow of said stream, said gate leaf being in the form of a sector of a cylinder the axis of which coincides with the axis of said hinging means, the one side of said platform being subjected to a hydraulic pressure corresponding to the pressure head of one of said reaches, and the other side of said platform being subjected to a different hydraulic pressure.

5. In a water system, means including an open channel for the flow of a stream of water, an automatic gate extending across said channel and separating an upstream reach of said stream from a downstream reach thereof, said gate comprising a wall extending across said channel, a substantially horizontal platform, means for hingedly mounting one end of said platform for substantially vertical swinging movement about a horizontal axis extending across said channel on said wall, and a gate leaf carried by the free end of said platform and extending across said channel for controlling the flow of said stream, said gate leaf being in the form of a sector of a cylinder the axis of which coincides with the axis of said hinging means, the one side of said platform being subjected to a hydraulic pressure corresponding to the pressure head of one of said reaches, means providing a chamber beneath said platform and in communication with the upstream reach, and means in communication with the chamber for maintaining the water directly below said platform at a constant pressure.

6. In a water system, means including an open channel for the flow of a stream of water, an automatic gate extending across said channel and separating an upstream reach of said stream from a downstream reach thereof, said gate comprising a wall extending across said channel, a substantially horizontal platform, means for hingedly mounting one end of said platform for substantially vertical swinging movement about a horizontal axis extending across said channel on said wall, a gate leaf carried by the free end of said platform and extending across said channel for controlling the flow of said stream, said gate leaf being in the form of a sector of a cylinder the axis of which coincides with the axis of said hinging means, and a fixed horizontal partition extending across said channel beneath said platform and cooperating with the latter to define a chamber, the free end of said platform cooperating with the gate leaf to form a water passage, said chamber communicating with a weir for maintaining water in said chamber at a constant pressure to subject the under surface of said platform to a constant pressure, the upper surface of said platform being exposed to the hydraulic pressure corresponding to the level of the downstream reach of said stream.

7. In a water system, means including an open channel for the flow of a stream of water, an automatic gate extending across said channel and separating an upstream reach of said stream from a downstream reach thereof, said gate comprising a wall extending across said channel, a substantially horizontal platform, means for hingedly mounting one end of said platform for substantially vertical swinging movement about a horizontal axis extending across said channel on said wall, a gate leaf carried by the free end of said platform and extending across said channel for controlling the flow of said stream, said gate leaf being in the form of a sector of a cylinder the axis of which coincides with the axis of said hinging means, a fixed horizontal partition extending across said channel beneath said platform and cooperating with the latter to define a chamber, the free end of said platform cooperating with the gate leaf to form a water passage, and a vertical conduit mounted on said platform at the hinged end thereof and communicating with said chamber, said conduit being open at its upper end for the discharge of water from said chamber whereby the underside of said platform will be subjected to a pressure corresponding to the head of water in said conduit, the upper side of said platform being subjected to a hydraulic pressure corresponding to the level of the downstream reach of said stream.

8. In a hydraulic system an open channel defined by lateral vertical walls, a transverse vertical wall separating the upstream and downstream reaches of the channel and open at its lower end, a second transverse vertical wall extending across said channel downstream of said first-mentioned transverse vertical wall and having a discharge opening therein, a tubular duct in said opening, an automatically regulated gate comprising a substantially horizontal platform, means for pivotally mounting said platform at one end to said transverse wall, apertures in said wall above the pivot of the platform, and an upper gate leaf rigidly integral with the free end of said platform, said gate leaf and platform extending throughout the width of said channel for forming a practical joint with said lateral vertical walls, said gate leaf being in form of a sector of a cylinder, the axis of which coincides with the axis about which said platform pivots, and cooperating with said tubular duct for controlling the discharge of water through the latter.

PIERRE FRANÇOIS DANEL.